(12) United States Patent
Takeshima et al.

(10) Patent No.: US 8,298,983 B2
(45) Date of Patent: Oct. 30, 2012

(54) PRODUCTION PROCESS OF COMPOSITE METAL OXIDE

(75) Inventors: Shinichi Takeshima, Numazu (JP); Akio Koyama, Yokohama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 412 days.

(21) Appl. No.: 12/373,803

(22) PCT Filed: Jul. 17, 2007

(86) PCT No.: PCT/JP2007/064388
§ 371 (c)(1),
(2), (4) Date: Jan. 14, 2009

(87) PCT Pub. No.: WO2008/010585
PCT Pub. Date: Jan. 24, 2008

(65) Prior Publication Data
US 2009/0264286 A1 Oct. 22, 2009

(30) Foreign Application Priority Data
Jul. 18, 2006 (JP) .................. 2006-195668

(51) Int. Cl.
*B01J 21/00* (2006.01)
(52) U.S. Cl. ........ 502/235; 502/300; 502/302; 502/305; 502/350; 502/353; 502/237; 502/340
(58) Field of Classification Search .................. 502/325, 502/344, 439, 302, 303, 304, 235, 300, 305, 502/350, 353, 237, 340
See application file for complete search history.

(56) References Cited

U.S. PATENT DOCUMENTS 5,021,392 A * 6/1991 Daly et al. ..................... 502/439
5,466,646 A * 11/1995 Moser ............................. 502/60

FOREIGN PATENT DOCUMENTS

| EP | 0 734 756 A2 | 10/1996 |
| JP | 1-201023 | 8/1989 |
| JP | 5-49864 | 3/1993 |
| JP | 6-198174 | 7/1994 |

(Continued)

OTHER PUBLICATIONS

Extended European Search Report dated Oct. 20, 2010 for EP Appl. No. 07791125.3.

*Primary Examiner* — Colleen Dunn
*Assistant Examiner* — Pritesh Darji
(74) *Attorney, Agent, or Firm* — Finnegan, Henderson, Farabow, Garrett & Dunner, LLP

(57) ABSTRACT

A process for producing a composite metal oxide of an acidic metal oxide and a basic metal oxide, wherein the process comprises (a) providing an aqueous solution containing a colloidal particle of the acidic metal oxide and a salt of the basic metal, (b) adjusting the pH of the aqueous solution to a pH at which a part of the basic metal dissolves in the aqueous solution, the remaining of the basic metal precipitates as a hydroxide and has a positive zeta potential, and the colloidal particle of the acidic metal oxide is not dissolved and has a negative surface potential, and then maintaining this pH over a predetermined time to obtain a precursor of the composite metal oxide, and (c) drying and firing the precursor of the composite metal oxide obtained.

9 Claims, 2 Drawing Sheets

FOREIGN PATENT DOCUMENTS

| | | |
|---|---|---|
| JP | 8-266865 | 10/1996 |
| JP | 11-267502 | 10/1999 |
| JP | 2001-000864 | 1/2001 |
| JP | 2001-314763 | 11/2001 |
| JP | 2002-282692 | 10/2002 |
| JP | 2005-518929 | 6/2005 |
| JP | 2005-254047 | 9/2005 |
| JP | 2005-313024 | 11/2005 |
| WO | WO 85/03239 | 8/1985 |
| WO | WO 2005/102523 | 11/2005 |

* cited by examiner

PRODUCTION PROCESS OF COMPOSITE METAL OXIDE

CROSS-REFERENCE TO RELATED APPLICATIONS

This application is a national phase application of International Application No. PCT/JP2007/064388, filed Jul. 17, 2007, and claims the priority of Japanese Application No. 2006-195668, filed Jul. 18, 2006, the contents of both of which are incorporated herein by reference.

TECHNICAL FIELD

The present invention relates to a production process of composite metal oxide, particularly a production process of composite metal oxide catalyst support.

BACKGROUND ART

In recent years, composite metal oxides have been developed and used in many applications such as catalysts, catalyst supports, adsorbents, electrodes, magnetic materials and electronic components, because of their unique properties.

In the field of an exhaust gas purifying catalyst, using a composite metal oxide as the catalyst support is attracting attention.

Conventionally, in the field of an exhaust gas purifying catalyst, in order to obtain a large surface area, alumina ($Al_2O_3$) has been generally used. However, in order to accelerate purification of an exhaust gas by using chemical properties of the support, recently it has been proposed to use a composite metal oxide containing various metal oxides such as alumina ($Al_2O_3$) ceria ($CeO_2$), zirconia ($ZrO_2$), titania ($TiO_2$) and silica ($SiO_2$), as a porous metal oxide support.

As the composite metal oxide support, a composite metal oxide of ceria and zirconia is generally known. A ceria-zirconia composite metal oxide can have significantly improved heat resistance compared with ceria alone, while providing the OSC (Oxygen Storage Capacity) of ceria, i.e., the capacity of storing oxygen when the oxygen concentration in an exhaust gas is high and releasing oxygen when the oxygen concentration in the exhaust gas is low.

Ceria-zirconia composite metal oxide is generally produced by a coprecipitation method of preparing an aqueous salt solution containing a cerium salt and a zirconium salt, making the aqueous salt solution basic pH to precipitate a ceria-zirconia composite metal oxide precursor, particularly a ceria-zirconia composite hydroxide, and then drying and firing the precursor.

Japanese Unexamined Patent Publication No. 5-49864 proposes to use a catalyst comprising metallosilicate, as an exhaust gas purifying catalyst other than a noble metal-supported alumina. The metallosilicate used here is a compound having a structure where at least a part of aluminium in zeolite is replaced by other elements. It is described that the element replacing aluminium in zeolite is preferably an element similar to aluminium in the ion radius or chemical properties, and iron, gallium, zinc and lanthanum are described as specific examples thereof.

In Japanese Unexamined Patent Publication No. 5-49864 above, an alkali metal-type metallosilicate is produced by the hydrothermal processing of a silica source and an alkali metal source, and then the alkali metal of the alkali metal-type metallosilicate is ion-exchanged with a desired metal, whereby the above-described metallosilicate is produced.

Japanese Unexamined Patent Publication No. 2001-314763 discloses a support for a $NO_x$ storage-reduction type catalyst, the support containing a titania-zirconia composite metal oxide and an element selected from the group consisting of lanthanum, neodymium and praseodymium.

In Japanese Unexamined Patent Publication No. 2001-314763 above, the titania-zirconia composite metal oxide is produced by a general coprecipitation method of mixing zirconium chloride and titanium tetrachloride in hydrochloric acid, and adding dropwise ammonia thereto to perform coprecipitation. Furthermore, this titania-zirconia composite metal oxide is dipped in a salt solution, such as lanthanum nitrate solution, and then dried and fired, whereby a support for $NO_x$ storage-reduction-type catalyst is obtained.

Japanese Unexamined Patent Publication No. 8-266865 discloses an exhaust gas purifying catalyst obtained by loading a platinum group element on a catalyst support layer such as silica, zeolite, silica-alumina and titania-alumina, wherein a composite metal oxide of vanadium and lanthanum or the like is further loaded on the catalyst support layer.

Incidentally, Japanese Unexamined Patent Publication No. 2002-282692 discloses a technique of suppressing sintering of rhodium by allowing a lanthanoid element present in zirconia to exert an anchoring effect, i.e., an effect of suppressing movement of rhodium on the zirconia surface.

Regarding the production process of a composite metal oxide, a method of mixing a plurality of kinds of powdery metal oxides and firing the mixture at a very high temperature; a method of dipping a metal oxide particle in a metal salt solution and then drying and firing the particle at a high temperature; and a so-called coprecipitation method are known.

Among these production processes, the coprecipitation method is preferred, for example, in that a composite metal oxide having a uniform composition can be obtained and that a composite metal oxide can be obtained by firing at a relatively low temperature.

However, in the coprecipitation method, it is difficult to obtain a uniform composite metal oxide of a basic metal oxide such as an alkaline earth metal oxide and rare earth oxide, and an acidic metal oxide such as silica and titanium. This is because the ion of a basic metal, for example lanthanum ion, forms a precipitate only at a relatively large basic pH, whereas the ion of acidic metal, for example silicon ion, forms a precipitate in a wide pH range excluding strongly acidic and strongly alkaline regions.

More specifically, in the case of performing the coprecipitation method by using a basic metal salt, such as lanthanum nitrate and an acidic metal salt, such as sodium silicate, the pHs at which these salts form precipitates significantly differ from each other, and the precipitates are formed at different timings. The precipitates containing respective metals form separate aggregates, and therefore a uniform precipitate containing the both metals can be hardly obtained.

Regarding the production of a composite metal oxide, use of a microemulsion method may be considered. In the microemulsion method, water is dispersed in a hydrophobic solvent together with an appropriate surfactant to obtain a liquid dispersion wherein fine water droplets are dispersed in the hydrophobic solvent. Thereafter, a water-soluble metal salt is added to the liquid dispersion, and then a metal hydroxide is precipitated in the fine water droplet dispersed in the hydrophobic solvent.

According to the microemulsion method, a composite metal oxide having a fine secondary particle diameter corresponding to the amount of the metal element contained in the fine water droplet can be obtained.

However, in this microemulsion method, a large amount of an organic solvent must be used in order to form fine water droplets, and this method is disadvantageous in terms of the cost of recovery and treatment of the organic solvent.

Accordingly, the present invention provides a production process of a composite metal oxide, the process enabling a composite metal oxide containing a plurality of kinds of metals having different properties to be easily obtained at a low cost.

DISCLOSURE OF THE INVENTION

The process of the present invention is a process for producing a composite metal oxide of an acidic metal oxide and a basic metal oxide, the acidic metal oxide having an electronegativity as a metal oxide of more than 2.80, and the basic metal oxide being an oxide of a basic metal selected from the group consisting of a rare earth and an alkaline earth metal. The process of the present invention comprises the following steps (a) to (c):

(a) providing an aqueous solution containing a colloidal particle of the acidic metal oxide and a salt of the basic metal, (b) adjusting the pH of the aqueous solution to a pH at which a part of the basic metal, for example from 0.1 to 5 mol %, particularly from 0.1 to 1.5 mol %, more particularly from 0.1 to 1 mol % of the basic metal, dissolves in the aqueous solution, the remaining of the basic metal precipitates as a hydroxide and has a positive zeta potential, and the colloidal particle of the acidic metal oxide is not dissolved and has a negative zeta potential (surface potential), and then maintaining this pH over a predetermined time to obtain a precursor of the composite metal oxide, and (c) drying and firing the precursor of the composite metal oxide.

According to the process of the present invention, in the step (b), a hydroxide of the basic metal is dissolved and reprecipitated by the equilibrium between the hydroxide of the basic metal and the ion of the metal, so that the hydroxide can be preferentially reprecipitated or rearranged on the surface of the colloidal particle of the acidic metal oxide. Therefore, according to the process of the present invention, a composite metal oxide precursor having a primary particle based on the colloidal particle of the acidic metal oxide can be obtained, and when the composite metal oxide precursor is dried and fired, a composite metal oxide having a primary particle based on the colloidal particle of the acidic metal oxide can be obtained.

In one embodiment of the present invention, the process further comprises, after step (a) and before step (b), adjusting the pH of the aqueous solution to be higher than the pH maintained in step (b).

According to this embodiment of the process of the present invention, most of the basic metal is precipitated as a hydroxide before the step (b), and both the colloidal particle of the acidic metal oxide and the hydroxide of the basic metal are allowed to form a precipitate in the step (b), so that these components can be closely located. According to this, rearrangement of the hydroxide of the basic metal on the surface of the colloidal particle of the acidic metal oxide can be promoted.

In one embodiment of the process of the present invention, the predetermined time in the step (b) is from 1 hour to 5 days, for example from 10 hours to 3 days.

In one embodiment of the present invention, the process further comprises, after step (b) and before step (c), adjusting the pH of the aqueous solution to be higher than the pH maintained in step (b).

According to this embodiment of the present invention, the hydroxide of the basic metal can be surely precipitated, and the obtained precursor can have a firm structure which withstands drying, firing or the like.

In one embodiment of the process of the present invention, the acidic metal oxide is selected from the group consisting of silica, titania, tungsten oxide, molybdenum oxide and niobium oxide, particularly from the group consisting of silica and titania.

In one embodiment of the process of the present invention, the basic metal is selected from the group consisting of rare earths, particularly from the group consisting of yttrium, lanthanum, praseodymium and neodymium.

In one embodiment of the process of the present invention, in the aqueous solution provided in the step (a), the ratio (molar rate) of acidic metal:basic metal is from 1:9 to 9:1, for example from 2:8 to 8:2.

In one embodiment of the process of the present invention, the composite metal oxide produced is a composite metal oxide catalyst support, particularly a composite metal oxide catalyst support particle.

In the case of producing a composite metal oxide catalyst support by the process of the present invention, the obtained composite metal oxide catalyst support can have a relatively neutral property as the entire catalyst support. Optionally, according to the composite metal oxide catalyst support obtained by the process of the present invention, high heat resistance can be provided by virtue of formation of a composite metal oxide, strong basicity can be locally provided in the basic metal oxide part, and/or strong acidity can be locally provided in the acidic metal oxide part.

The composite metal oxide of the present invention is produced by the process of the present invention.

The exhaust gas purifying catalyst of the present invention is obtained by loading a noble metal on a composite metal oxide catalyst support produced by the process of the present invention.

BEST MODE FOR CARRYING OUT THE INVENTION

The process of the present invention for producing a composite metal oxide of an acidic metal oxide and a basic metal oxide comprises the following steps (a) to (c):

(a) providing an aqueous solution containing a colloidal particle of the acidic metal oxide and a salt of the basic metal, (b) adjusting the pH of the aqueous solution to a pH at which a part of the basic metal dissolves in the aqueous solution, the remaining of the basic metal precipitates as a hydroxide and have a positive zeta potential, and the colloidal particle of the acidic metal oxide is not dissolved and has a negative zeta potential, and then maintaining this pH over a predetermined time to obtain a precursor of the composite metal oxide, and (c) drying and firing the precursor of the composite metal oxide.

In the step (b) of this process of the present invention, as regards the basic metal (A), an equilibrium shown by the following formula (I), i.e., an equilibrium between the ion of the basic metal ($A^{a+}$) and the hydroxide precipitate of the metal ($A(OH)_a$), is present:

$$A^{a+} + aOH^- \longleftrightarrow A(OH)_a\downarrow \qquad \text{Formula (I)}$$

(wherein A is the basic metal, and a is the valence of the basic metal A).

In the case where the system is in the equilibrium state, the basic metal (A) does not show apparent movement. However, actually, the basic metal (A) keeps this equilibrium state by repeating dissolution as the metal ion ($A^{a+}$) and precipitation as the hydroxide ($A(OH)_a$). The frequency of dissolution and precipitation of the basic metal becomes relatively large when the equilibrium of formula (I) is not extremely disproportionate to either the side where the basic metal dissolves as the ion (left side of formula (I)) or the side where the basic metal precipitates as the hydroxide (right side of formula (I)).

Figure 2:
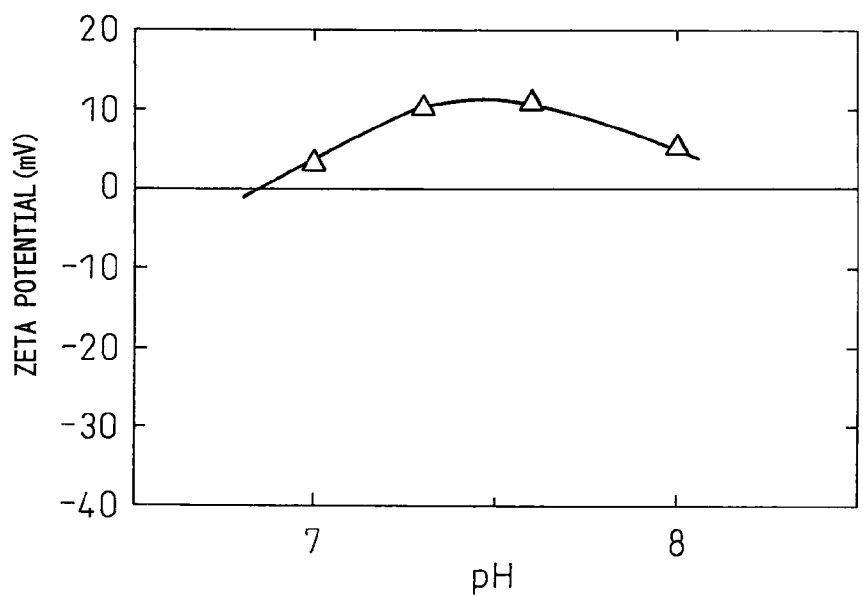
FIG. 2 is a view showing the zeta potential curve of lanthanum hydroxide.
Figure 3:
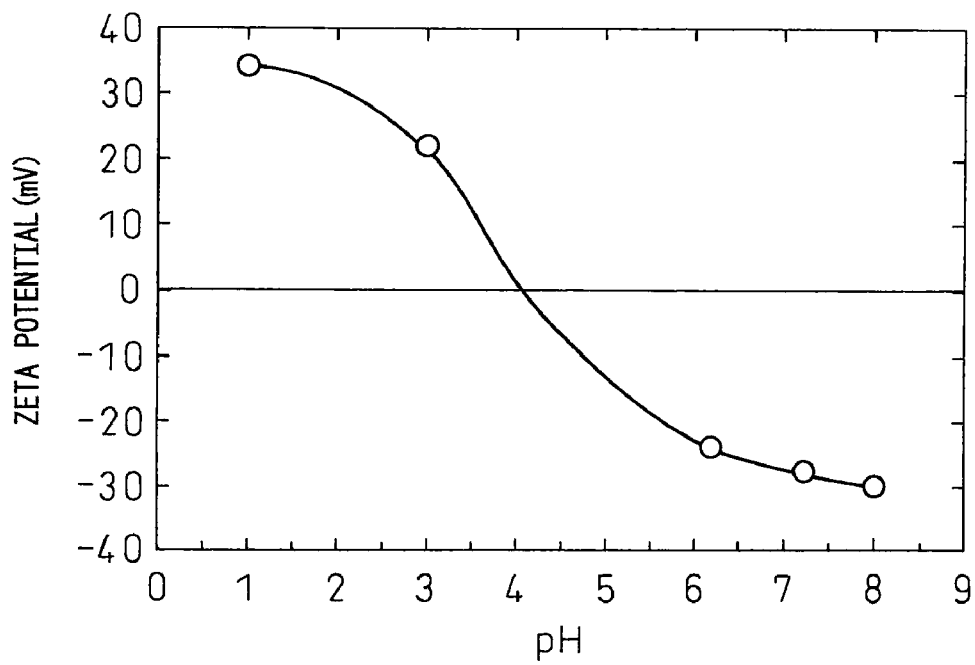
FIG. 3 is a view showing the zeta potential curve of titania particle.

The hydroxide of the basic metal obtained, particularly the hydroxide of a rare earth, generally can have a positive zeta potential. In other words, the hydroxide of the basic metal generally has a zeta potential curve as shown in FIG. 2 in terms of yttrium hydroxide. The colloidal particle of the metal oxide generally has a positive zeta potential in a relatively acidic solution, and the zeta potential decreases as the pH increases. Then, in a relatively basic solution, the colloidal particle of the metal oxide has a negative zeta potential. In other words, the colloidal particle of the metal oxide generally has a zeta potential curve as shown in FIG. 3 in terms of the colloidal particle of titania.

Figure 1:
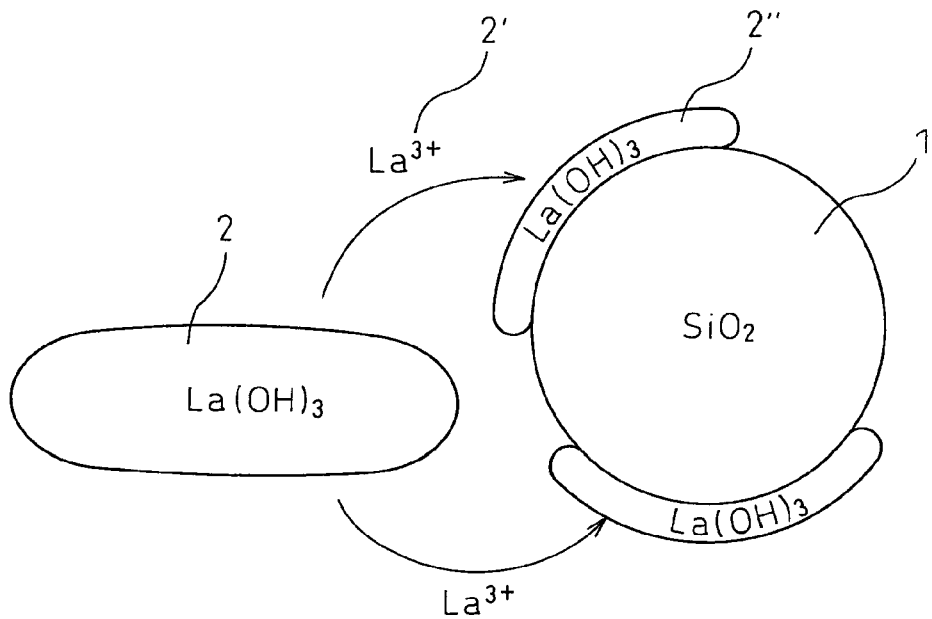
FIG. 1 is a conceptual view showing the mechanism of the process of the present invention.

Accordingly, in step (b), the basic metal hydroxide having a positive zeta potential preferentially reprecipitates on the surface of the acidic metal-oxide colloidal particle having a negative zeta potential. In other words, for example, as shown in FIG. 1 regarding an embodiment of using lanthanum (La) as the basic metal and silicon (Si) as the acidic metal, a part of the basic metal hydroxide 2 ($La(OH)_3$) having a positive zeta potential becomes an ion 2' ($La^{3+}$) dissolved in an aqueous solution, and then preferentially reprecipitates as a hydroxide 2" ($La(OH)_3$) on the surface of the acidic metal-oxide colloidal particle 1 ($SiO_2$) having a negative zeta potential.

In the process of the present invention, it is considered that a complex metal oxide precursor having a primary particle based on the colloidal particle of an acidic metal oxide is obtained by such a mechanism.

<Acidic Metal Oxide>

The "acidic metal oxide" as used in the present invention means a metal oxide having an electronegativity as a metal oxide of more than 2.80. The "electronegativity as a metal oxide" is a value obtained by weighted-averaging the Pauling electronegativities of the metal element and oxygen constituting the metal oxide according to the ratio of the elements contained in the metal oxide. Incidentally, the "acidic metal" used in the present invention means a metal constituting the acidic metal oxide.

For example, the electronegativity as a metal oxide of silica ($SiO_2$) is calculated as follows.

$$\{1.90 \text{ (electronegativity of silicone)} \times 1 + 3.44 \text{ (electronegativity of oxygen)} \times 2\}/3 = \text{about } 2.93$$

Examples of the thus-calculated electronegativity as a metal oxide are shown in Table 1 below.

TABLE 1

| Oxide | Electronegativity | Acidity, Basicity |
|---|---|---|
| BaO | 2.17 | Basic |
| $La_2O_3$ | 2.50 | |
| $Nd_2O_3$ | 2.52 | ↑ |
| $Al_2O_3$ | 2.71 | |
| $ZrO_2$ | 2.74 | |
| $TiO_2$ | 2.81 | |
| $SiO_2$ | 2.93 | |
| $NbO_2$ | 2.83 | ↓ |
| $MoO_2$ | 3.01 | Acidic |
| $WO_2$ | 3.08 | |

When the electronegativity as a metal oxide is large, the metal oxide has a relatively acidic property, whereas when the electronegativity as a metal oxide is small, the metal oxide has a relatively basic property.

Incidentally, in the present invention, the electronegativity of oxygen used for the calculation of the electronegativity of the metal oxide is 3.44, and the electronegativity of the metal is as follows.
Typical Metal Element:
(First to Third Period)
 Li (0.98), Be (1.57), Na (0.93), Mg (1.31), Al (1.61), Si (1.90).
(Fourth Period)
 K (0.82), Ca (1.00), Zn (1.65), Ga (1.81), Ge (2.01).
(Fifth Period)
 Rb (0.82), Sr (0.95), Cd (1.69), In (1.78), Sn (1.96), Sb (2.05).
(Sixth Period)
 Cs (0.79), Ba (0.89), Hg (2.00), Tl (1.62), Pb (2.33), Bi (2.02), Po (2.0).
(Seventh Period)
 Fr (0.7), Ra (0.9).
Transition Metal Element:
(Fourth Period)
 Sc (1.36), Ti (1.54), V (1.63), Cr (1.66), Mn (1.55), Fe (1.83), Co (1.88), Ni (1.91), Cu (1.90).
(Fifth Period)
 Y (1.22), Zr (1.33), Nb (1.6), Mo (2.16), Tc (1.9), Ru (2.2), Rh (2.28), Pd (2.20), Ag (1.93).
(Sixth Period)
 Hf (1.3), Ta (1.5), W (2.36), Re (1.9), Os (2.2), Ir (2.20), Pt (2.28), Au (2.54).
(Lanthanoid Element)
 La (1.1), Ce (1.12), Pr (1.13), Nd (1.14), Pm (1.13), Sm (1.17), Eu (1.2), Gd (1.2), Tb (1.1), Dy (1.22), Ho (1.23), Er (1.24), Tm (1.25), Yb (1.1), Lu (1.27).
(Actinoid Element)
 Ac (1.1), Th (1.3), Pa (1.5), U (1.38), Np (1.36), Pu (1.28), Am (1.13), Cm (1.28), Bk (1.3), Cf (1.3), Es (1.3), Fm (1.3), Md (1.3), No (1.3), Lr (–).

The colloidal particle of the acidic metal oxide use in the process of the present invention generally has a positive zeta potential at a relatively acidic pH, and a negative zeta potential at a relatively basic pH. However, the isoelectric point of the colloidal particle can be adjusted by surface modification of the colloidal particle, particularly by the surface modification of the colloidal particle with an organic compound.

Specific examples of the colloidal particle include a substance obtained by hydrolyzing and condensing an alkoxide, acetylacetonate, acetate or nitrate of a metal. A colloidal solution (sol), such as a silica colloidal solution and titania colloidal solution, is a known material, and is also commercially available.

In the case of obtaining a composite metal oxide catalyst support by the process of the present invention, an acidic metal oxide used in a catalyst support, for example a metal oxide selected from the group consisting of silica, titania, tungsten oxide, molybdenum oxide and niobium oxide, particularly silica and/or titania, can be used.

<Basic Metal Oxide>

The "basic metal" as used in the present invention means a metal selected from the group consisting of a rare earth and an alkaline earth metal. The "basic metal oxide" as used in the present invention means an oxide of a basic metal.

The basic metal salt includes any salt that can be dissolved in the aqueous solution used in the present invention. Accordingly, the basic metal salt used in the present invention includes an inorganic acid salt such as nitrate, and an organic acid salt such as acetate.

In the case of obtaining a composite metal oxide catalyst support by the process of the present invention, the basic metal is preferably an electron-accepting metal element that accepts an electron from a noble metal element, for example a rare earth element. The electron-accepting metal element is preferably a rare earth element which has a smaller atomic number and forms an ion having one or more vacancies in the 4f, 4d or 5d orbit, such as yttrium, lanthanum, praseodymium and neodymium. When a noble metal as a catalyst metal is loaded on a composite metal oxide catalyst support having an oxide of such a metal element, the electron of the noble metal element, particularly platinum, is coordinated to the composite metal oxide support, and thereby sintering of the noble metal can be suppressed during use of the catalyst.

In the case of obtaining a composite metal oxide catalyst support by the process of the present invention, most preferably, the basic metal is an electron-accepting metal element that accepts an electron from a noble metal element and that is not changed in the atomic valence due to an oxidation-reduction reaction during use of the catalyst, for example lanthanum or neodymium. When a noble metal as a catalyst metal is loaded on a composite metal oxide catalyst support having an oxide of such a metal element, sintering of the noble metal can be more successfully suppressed during use of the catalyst. This is because, in the case of using an oxide of an element that changes in the atomic valence due to an oxidation-reduction reaction during use of the catalyst, for example in the case of using ceria that is preferably used in terms of OSC, the atomic valence changes in a reducing atmosphere, and thereby the interaction between the metal oxide and a noble metal decreases.

<Combination of Acidic Metal Oxide and Basic Metal Oxide>

According to the process of the present invention, irrespective of difference in the property between an acidic metal and a basic metal, a composite metal oxide of an acidic metal oxide and a basic metal oxide can be obtained in any combination and in any ratio. Accordingly, the ratio of acidic metal:basic metal (molar rate) may be, for example, from 1:9 to 9:1.

In the case of obtaining a composite metal oxide catalyst support by the process of the present invention, preferably, the acidic metal oxide is selected from the group consisting of silica, titania, tungsten oxide, molybdenum oxide and niobium oxide, particularly the group consisting of silica and titania; and the basic metal is selected from the group consisting of rare earths, particularly the group consisting of yttrium, lanthanum, praseodymium and neodymium, more particularly the group consisting of lanthanum and neodymium.

In the composite metal oxide catalyst support of the present invention, a basic metal oxide and an acidic metal oxide are used in combination, and thereby the catalyst support as a whole can have a relatively neutral property.

Regarding the catalyst support for an exhaust gas purifying catalyst, it may be considered that a metal oxide having a larger electronegativity than alumina ($Al_2O_3$) is acidic, and a metal oxide having a smaller electronegativity than alumina is basic.

Generally, when the catalyst support for an exhaust gas purifying catalyst is strongly basic, hydrocarbon (HC) can hardly adsorb to the support and accordingly, the HC oxidation performance tends to decrease. In this case, in a lean atmosphere wherein oxygen presents in an excess amount, the oxygen may adsorb to the catalyst support, and thereby a noble metal such as platinum supported on the catalyst support may be poisoned by oxygen, resulting in reduction in the catalytic activity. On the other hand, when the catalyst support for an exhaust gas purifying catalyst is strongly acidic, the support may attract an electron from a noble metal supported thereon, and thereby an $NO_x$ reduction reaction on the noble metal may be inhibited.

Accordingly, it is sometimes preferred that the catalyst support for an exhaust gas purifying catalyst has relatively neutral electronegativity similar to that of alumina. In this regard, the electronegativity of the composite metal oxide is shown in Table 2 below with respect to the ratio of silica ($SiO_2$) as an acidic metal oxide to lanthanum oxide ($La_2O_3$) as a basic metal oxide. Incidentally, the electronegativity of alumina ($Al_2O_3$) is 2.71.

TABLE 2

Electronegativity of Lanthanum Oxide-Silica Composite Metal Oxide

| Ratio of Lanthanum Oxide ($La_2O_3$) | Ratio of Silica ($SiO_2$) | Electronegativity |
|---|---|---|
| 0.0 | 1.0 | 2.93 |
| 0.1 | 0.9 | 2.89 |
| 0.2 | 0.8 | 2.84 |
| 0.3 | 0.7 | 2.80 |
| 0.4 | 0.6 | 2.76 |
| 0.5 | 0.5 | 2.72 |
| 0.6 | 0.4 | 2.67 |
| 0.7 | 0.3 | 2.63 |
| 0.8 | 0.2 | 2.59 |
| 0.9 | 0.1 | 2.54 |
| 1.0 | 0.0 | 2.50 |

<Adjustment of pH>

The pH in the step (b), i.e. the pH at which a part of the basic metal dissolves in the aqueous solution, the remaining of the basic metal precipitates as a hydroxide and have a positive zeta potential, and the colloidal particle of the acidic metal oxide is not dissolved and has a negative zeta potential, depends on the composition, temperature, concentration or the like of the aqueous solution used, and may be determined based on an experiment. In the case where the basic metal is a rare earth, the pH at which a part of the basic metal dissolves in the aqueous solution, and the remaining of the basic metal precipitates as a hydroxide and have a positive zeta potential is, for example, a pH of from 7 to 9.

Figure 4:
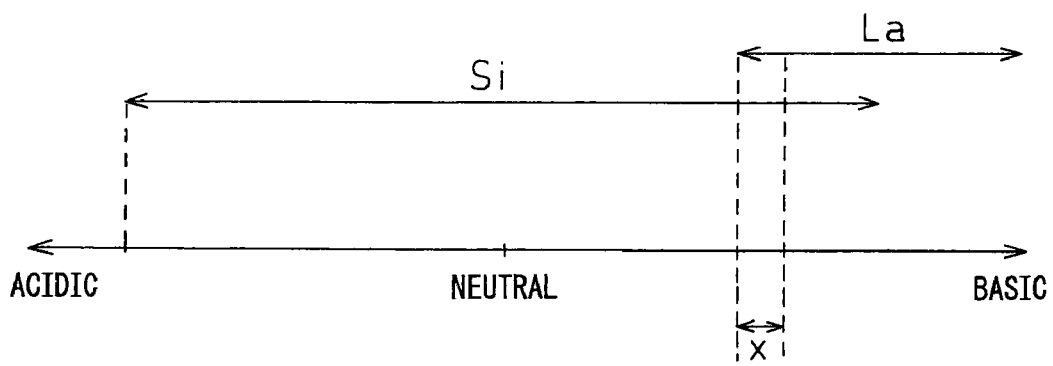
FIG. 4 is a view explaining the pH range maintained in the step (b) of the process of the present invention.

As regards the pH in the step (b), FIG. 4 conceptually shows the pH range (La) where a part of lanthanum as a basic metal precipitates as a hydroxide and has a positive zeta potential, and the pH range (Si) where a colloidal particle of silica as an acidic metal oxide is not dissolved.

In FIG. 4, the pH in the step (b) can be expressed by a pH range x. For example, in the pH range, from 0.1 to 5 mol % of the basic metal is dissolved as an ion in the aqueous solution. This proportion can be found by filtering the precipitate in an equilibrium state, and measuring the amount of the basic metal contained in the precipitate or the amount of the basic metal contained in the filtrate.

If the pH in the step (b) is excessively large, and thereby the substantially entire basic metal precipitates as a hydroxide, an extremely long time is required for rearranging an oxide of the basic metal on the surface of a colloidal particle of the acidic metal oxide, and therefore rearrangement can be hardly achieved. If the pH in step (b) is excessively large, the colloidal particle of the acidic metal oxide may dissolve and thereby may not have a negative zeta potential.

If the pH in step (b) is excessively small, and thereby the basic metal does not precipitate as a hydroxide, a hydroxide of the basic metal is not sufficiently rearranged on the surface of a colloidal particle of the acidic metal oxide.

In step (b), the time for which the solution is maintained at a predetermined pH depends on the temperature, concentration and property of the aqueous solution, particularly the pH of the aqueous solution, and the concentration, solubility and the like of the basic metal intended to be rearranged. The time for which the solution is maintained at a predetermined pH in step (b) may be, for example, from 1 hour to 5 days.

In the case of precipitating a majority of the basic metal as a hydroxide before the step (b) by adjusting, after the step (a) and before the step (b), the pH of the aqueous solution to be higher than the pH maintained in the step (b), the pH above can be optionally determined according to the property of the basic metal, the temperature of the aqueous solution, and the like. For example, as the pH, a pH larger by 1 or more or by 2 or more than the pH maintained in step (b) may be selected.

In the case of surely precipitating the basic metal from the aqueous solution of the step (b) by adjusting, after the step (b) and before the step (c), the pH of the aqueous solution to be higher than the pH maintained in the step (b), the pH above can be optionally determined according to the property of the basic metal, the temperature of the aqueous solution, and the like. For example, as the pH, a pH larger by 1 or more or by 2 or more than the pH maintained in step (b) may be selected.

<Drying and Firing of Composite Metal Oxide Precursor>

In the process of the present invention, the obtained composite metal oxide precursor is dried and fired, whereby a composite metal oxide having a primary particle based on the colloidal particle of the acidic metal oxide can be obtained.

The removal and drying of the dispersion medium from the composite metal oxide precursor can be performed by any method and at any temperature, and for example, may be achieved by placing the composite metal oxide precursor in an oven at 120° C. The raw material obtained by thus removing and drying the dispersion medium from the composite metal oxide precursor can be fired to obtain a composite metal oxide. The firing may be performed at a temperature generally employed in the synthesis of a metal oxide, for example at a temperature of 500 to 800° C.

<Production of Exhaust Gas Purifying Catalyst>

The exhaust gas purifying catalyst of the present invention can be obtained by loading a noble metal such as platinum on a composite metal oxide catalyst support produced by the process of the present invention. The noble metal may be loaded by any method and, for example, in the case of loading platinum, the composite metal oxide can be impregnated with an aqueous dinitrodiamine platinum nitrate solution, dried and fired to obtain the exhaust gas purifying catalyst of the present invention comprising from 0.5 to 2 wt % of platinum supported thereon.

In the case of further loading an $NO_x$ storage material such as barium on the catalyst support to obtain an $NO_x$ storage-reduction catalyst, an $NO_x$ storage material such as barium can be loaded by impregnating the catalyst support with a solution containing a salt of such a metal, for example a barium acetate solution, and then drying and firing the support.

EXAMPLES

Example 1

A lanthanum oxide-silica composite metal oxide catalyst support was produced as follows according to the process of the present invention.

A silica sol (SNOWTEX NXS, produced by Nissan Chemicals Industries, Ltd., average particle diameter: about 5 nm) was diluted with distilled water to obtain a diluted colloidal silica sol. A commercially available aqueous lanthanum nitrate solution was diluted with distilled water to obtain a diluted aqueous lanthanum nitrate solution. The diluted colloidal silica sol and the diluted aqueous lanthanum nitrate solution were mixed to obtain 10 L of an acidic mixed solution (pH: from 2.5 to 3.0) containing colloidal silica and lanthanum nitrate. In this mixed solution, lanthanum (La): silicon (Si) (molar ratio) was 62.5:37.5. The target yield was 350 g.

The pH of this mixed solution was adjusted to 8.5 by adding aqueous ammonia, and then maintained for 2 days (at this pH, about 1% of lanthanum is dissolved in the solution in an equilibrium state). Subsequently, the pH was adjusted to 10 by further adding aqueous ammonia to obtain a precipitate. The thus-obtained precipitate was filtered, washed with a small amount of diluted aqueous ammonia having a pH of 10, again filtered, dried over one day, and then fired at 800° C. over 5 hours to obtain a lanthanum oxide-silica composite metal oxide catalyst support.

Example 2

A lanthanum oxide-silica composite metal oxide catalyst support was produced as follows according to the process of the present invention.

In the same manner as Example 1, 10 L of a mixed solution containing colloidal silica and lanthanum nitrate was obtained.

The pH of this mixed solution was adjusted to 10 by adding aqueous ammonia to generate a precipitate. The pH of the mixed solution containing a precipitate was adjusted to 8.5 by adding nitric acid, and then maintained for over 2 days. Subsequently, the pH was adjusted to 10 by again adding aqueous ammonia. The thus-obtained precipitate was, in the same manner as Example 1, filtered, washed with diluted aqueous ammonia having a pH of 10, again filtered, dried over one day, and then fired at 800° C. over 5 hours to obtain a lanthanum oxide-silica composite metal oxide catalyst support.

Example 3

A lanthanum oxide-titania composite metal oxide catalyst support was produced as follows according to the process of the present invention.

A titania sol (STS-100, produced by Ishihara Sangyo Kaisha, Ltd.) was diluted with distilled water to obtain a diluted titania sol. Also, a commercially available aqueous lanthanum nitrate solution was diluted with distilled water to obtain a diluted aqueous lanthanum nitrate solution. The diluted titania sol and the diluted aqueous lanthanum nitrate solution were mixed to obtain 10 L of a mixed solution (pH: about 3) containing colloidal titania and lanthanum nitrate. In this mixed solution, lanthanum (La):titanium (Ti) (molar ratio) was 1:1. The target yield was 40 g.

The pH of this mixed solution was adjusted to 10 by adding aqueous ammonia to generate a precipitate. Furthermore, the pH of the mixed solution containing the precipitate was adjusted to 8.5 by adding nitric acid, and then maintained for 2 days (at this pH, about 1% of lanthanum is dissolved in the solution in an equilibrium state). Subsequently, the pH was adjusted to 10 by again adding aqueous ammonia. The thus-obtained precipitate was filtered, washed with diluted aqueous ammonia, again filtered, dried over one day, and then fired at 800° C. over 5 hours to obtain a lanthanum oxide-titania composite metal oxide catalyst support.

Example 4

A yttrium oxide-titania composite metal oxide catalyst support was produced as follows according to the process of the present invention.

A titania sol (STS-100, produced by Ishihara Sangyo Kaisha, Ltd.) was diluted with distilled water to obtain a diluted titania sol. A commercially available aqueous yttrium nitrate solution was diluted with distilled water to obtain a diluted aqueous yttrium nitrate solution. The diluted titania sol and the diluted aqueous yttrium nitrate solution were mixed to obtain 10 L of a mixed solution (pH: about 3) containing colloidal titania and yttrium nitrate. In this mixed solution, yttrium (Y):titanium (Ti) (molar ratio) was 1:1. The target yield was 40 g.

The pH of this mixed solution was adjusted to 8.3 by adding aqueous ammonia to generate a precipitate. Furthermore, the pH of the mixed solution containing the precipitate was adjusted to 7.1 by adding nitric acid, and then maintained for 2 days (at this pH, about 1% of yttrium is dissolved in the solution in an equilibrium state). Subsequently, the pH was adjusted to 8.3 by again adding aqueous ammonia. The thus-obtained precipitate was filtered, washed with diluted aqueous ammonia, again filtered, dried over one day, and then fired at 800° C. over 5 hours to obtain an yttrium oxide-titania composite metal oxide catalyst support having a pyrochlore structure and a composition of $YTiO_{3.5}$.

Comparative Example 1

A lanthanum oxide-silica composite metal oxide catalyst support was produced in the same manner as Example 1, except for not maintaining the mixed solution containing colloidal silica and lanthanum nitrate at the basic pH, i.e., a lanthanum oxide-silica composite metal oxide catalyst support was produced as follows.

In the same manner as Example 1, 10 L of a mixed solution containing colloidal silica and lanthanum nitrate was obtained.

This mixed solution was maintained over 1 day and thereby homogenized. Subsequently, the pH was adjusted to 10 by adding aqueous ammonia to obtain a precipitate. The thus-obtained precipitate was, in the same manner as Example 1, filtered, washed with diluted aqueous ammonia having a pH of 10, again filtered, dried over one day, and then fired at 800° C. over 5 hours to obtain a lanthanum oxide-silica composite metal oxide catalyst support.

Comparative Example 2

A lanthanum oxide-silica composite metal oxide catalyst support was produced in the same manner as Example 1 except for keeping the mixed solution containing colloidal silica and lanthanum nitrate at a basic pH at which the substantially entire lanthanum precipitated as a hydroxide, i.e., a lanthanum oxide-silica composite metal oxide catalyst support was produced as follows.

In the same manner as Example 1, 10 L of a mixed solution containing colloidal silica and lanthanum nitrate was obtained.

The pH of this mixed solution was adjusted to 10 by adding aqueous ammonia to obtain a precipitate, and then the solution was maintained over 2 days (at this pH, the substantially entire lanthanum precipitates as a hydroxide in an equilibrium state, and lanthanum does not substantially dissolve in the solution). Subsequently, the thus-obtained precipitate was, in the same manner as Example 1, filtered, washed with diluted aqueous ammonia having a pH of 10, again filtered, dried over one day, and then fired at 800° C. over 5 hours to obtain a lanthanum oxide-silica composite metal oxide catalyst support.

Comparative Example 3

A lanthanum oxide-silica composite metal oxide catalyst support was produced by a coprecipitation method using lanthanum nitrate as the lanthanum source and an aqueous sodium silicate solution (water glass) as the silica source, as follows.

An aqueous sodium silicate solution was diluted with distilled water to obtain a diluted aqueous sodium silicate solution. A commercially available aqueous lanthanum nitrate solution was diluted with distilled water to obtain a diluted aqueous lanthanum nitrate solution. When the diluted aqueous lanthanum nitrate solution was mixed with the diluted aqueous sodium silicate solution, a precipitate was immediately generated. After stirring over 10 minutes, the precipitate was filtered, washed with diluted aqueous ammonia having a pH of 10 to remove the sodium ion as much as possible, again filtered, dried for one day, and then fired at 800° C. over 5 hours to obtain a lanthanum oxide-silica composite metal oxide catalyst support.

The thus-obtained composite metal oxide of Comparative Example 3 distinctly differed in the aggregated state from the composite metal oxides obtained in Examples 1 and 2 and Comparative Example 1, and the apparent volume was reduced to about 1/7. The specific surface area of the composite metal oxide of Comparative Example 3 was 5.7 $m^2/g$, and this surface area is considered to be insufficient as a composite metal oxide for a catalyst support.

Comparative Example 4

A lanthanum oxide-silica composite metal oxide catalyst support was produced by a microemulsion method, as follows.

In a solvent obtained by dissolving 456.9 g of an alkyl-based surfactant BC-5.5 (trade name) in 6,485 ml of cyclohexane, 180 ml of an aqueous solution containing lanthanum nitrate (0.3016 mol, concentration: 1.675 M) as the lanthanum source and aqueous ammonia (0.3748 mol, concentration: 2.082 M) was mixed together with 22.6 ml of 2-butanol to prepare a microemulsion solution.

As a silicon source, an alkoxide solution was prepared by dissolving 0.1809 mol of tetraethoxysilane (TEOS) in 1,000 ml of cyclohexane.

The alkoxide solution was mixed with the microemulsion solution prepared above, and then 79.85 ml of aqueous ammonia having a concentration of 14.8 M and 7.69 ml of distilled water were added thereto. In this state, the ratio of organic solvent to surfactant (O/S ratio) was 63.6, the ratio of oil phase to water phase (O/W) was 6, the predicted micell diameter (dw) was 40 nm, and the pH was 8.1. The mixing time was 5 minutes. As a result, hydrolysis took place to produce a primary particle of a lanthanum oxide-silica composite metal oxide precursor, and these primary particles were aggregated to produce a secondary particle.

Subsequently, 300 ml of ethanol, 192.82 ml of aqueous ammonia having a concentration of 14.8 M and 18.57 ml of distilled water were added thereto to bring the microemulsion solution into a two-phase region, and then the secondary particles were aggregated with each other by aging with stirring. At this time, the pH was 10.0, the ratio of water phase to surfactant (W/S ratio) was 34.2, and the aging was performed over 60 minutes.

The thus-obtained aggregate was taken out, the adhered surfactant was washed off with an alcohol, then the aggregate was dried and fired to obtain a lanthanum oxide-silica composite metal oxide catalyst support.

Evaluation:

The composite metal oxide catalyst supports of Examples and Comparative Examples each in a slurry form was coated on a monolith honeycomb substrate in an amount of 120 g/L-substrate, then dried and fired. Subsequently, 1.2 g of platinum/L-substrate was loaded on the monolith honeycomb substrate having the composite metal oxide catalyst support of Examples and Comparative Examples to obtain exhaust gas purifying catalysts of Examples and Comparative Examples. The thus-obtained exhaust gas purifying catalysts of Examples and Comparative Examples were heated in air at 800° C. for 2 hours, and thereby subjected to endurance condition.

The exhaust gas purifying catalysts of Examples and Comparative Examples subjected to endurance condition were evaluated for the specific surface area of the support and the particle diameter of platinum supported thereon. Also, an evaluation gas having a composition shown in Table 3 below was fed to these exhaust gas purifying catalysts, and by gradually raising the temperature of the evaluation gas, the temperature at which the $NO_x$ purification percentage reached 50% ($NO_x$ 50% purification temperature) was examined. When the $NO_x$ 50% purification temperature is relatively low, the catalyst has better low-temperature activity.

TABLE 3

| | Composition of Evaluation Gas | | | | | | | |
|---|---|---|---|---|---|---|---|---|
| | $N_2$ (%) | $CO_2$ (%) | NO (ppm) | CO (ppm) | $C_3H_6$ (ppmC) | $H_2$ (%) | $O_2$ (%) | $H_2O$ (%) |
| Evaluation gas | balance | 12 | 2.500 | 6.000 | 3.000 | — | 0.4 | 10 |

The evaluation results of the specific surface area of the support, the particle diameter of platinum supported and the $NO_x$ 50% purification temperature are shown in Table 4 below.

TABLE 4

| | | | Evaluation Results | | |
|---|---|---|---|---|---|
| | Composition | Basic Metal Dissolved in Step (b) (mol %) | Surface Area of Support after Endurance (m²/g) | Pt Particle Diameter after Endurance (nm) | $NO_x$ 50% Purification Temperature (° C.) |
| Example 1 | lanthanum oxide-silica composite metal oxide | 1 | 48 | — | 402 |
| Example 2 | lanthanum oxide-silica composite metal oxide | 1 | — | — | 371 |
| Example 3 | lanthanum oxide-titania composite metal oxide | 1 | — | — | 385 |
| Example 4 | yttrium oxide-titania composite metal oxide | 1 | — | — | 389 |
| Comparative Example 1 (not maintained at basic pH) | lanthanum oxide-silica composite metal oxide | — | — | — | 455 |
| Comparative Example 2 (no dissolution of lanthanum) | lanthanum oxide-silica composite metal oxide | none | 21 | 35.6 | — |
| Comparative Example 3 (coprecipitation of sodium silicate and lanthanum nitrate) | lanthanum oxide-silica composite metal oxide | — | 5.7 | — | 645 |
| Comparative Example 4 (microemulsion method) | lanthanum oxide-silica composite metal oxide | — | — | — | 368 |

As understood from Table 4 above, although the catalyst supports of Examples of the present invention is obtained by a relatively easy production process, they have a performance comparable to that of a catalyst support obtained by a microemulsion method (Comparative Example 4). On the other hand, when a mixed solution containing colloidal silica and lanthanum nitrate is not maintained at a basic pH (Comparative Example 1) or when the mixed solution is maintained at a basic pH at which the substantially entire lanthanum precipitates as a hydroxide (Comparative Example 2), the effects as obtained in Examples of the present invention are not obtained.

As understood by comparing the catalyst supports of Examples 1 and 2 having the same composition, better effects are obtained in Example 2 where the solution is adjusted to a relatively high basicity before keeping a basic pH.

The invention claimed is:

1. A process for producing a composite metal oxide of an acidic metal oxide and a basic metal oxide, the acidic metal oxide having an electronegativity as a metal oxide of more than 2.80, and the basic metal oxide being an oxide of a basic metal selected from the group consisting of a rare earth and an alkaline earth metal, wherein the process comprises:
   (a) providing an aqueous solution containing a colloidal particle of said acidic metal oxide and a salt of said basic metal,
   (b) adjusting the pH of said aqueous solution to a pH of 7 to 9 at which 0.1 mol % to 5 mol % of said basic metal dissolves in said aqueous solution, the remaining of said basic metal precipitates as a hydroxide and has a positive zeta potential, and the colloidal particle of said acidic metal oxide is not dissolved and has a negative zeta potential, and then maintaining this pH over a predetermined time to obtain a precursor of said composite metal oxide, and
   (c) drying and firing the precursor of said composite metal oxide.

2. The process according to claim 1, wherein the process further comprises, after the step (a) and before the step (b), adjusting the pH of said aqueous solution to be higher than the pH maintained in the step (b).

3. The process according to claim 1, wherein 0.1 to 1.5 mol % of said basic metal is dissolved in said aqueous solution at the pH maintained in the step (b).

4. The process according to claim 1, wherein said predetermined time in the step (b) is from 1 hour to 5 days.

5. The process according to claim 1, wherein the process further comprises, after the step (b) and before the step (c), adjusting the pH of said aqueous solution to be higher than the pH maintained in the step (b).

6. The process according to claim 1, wherein said acidic metal oxide is selected from the group consisting of silica, titania, tungsten oxide, molybdenum oxide and niobium oxide.

7. The process according to claim 1, wherein said basic metal is a rare earth.

8. The process according to claim 1, wherein the acidic metal constituting said acidic metal oxide:said basic metal (molar ratio) is from 1:9 to 9:1 in said aqueous solution provided in the step (a).

9. The process according to claim 1, wherein said composite metal oxide is a composite metal oxide catalyst support.

* * * * *